US012697543B2

(12) United States Patent
Srivastava et al.

(10) Patent No.: US 12,697,543 B2
(45) Date of Patent: Aug. 4, 2026

(54) VARYING JUST NOTICEABLE DIFFERENCE (JND) THRESHOLD OR BIT RATES FOR GAME VIDEO ENCODING BASED ON POWER SAVING REQUIREMENTS

(71) Applicant: Sony Interactive Entertainment Inc., Tokyo (JP)

(72) Inventors: Manoj Kumar Srivastava, San Francisco, CA (US); Mario Sarria, San Jose, CA (US); Eric Hsuming Chen, Saratoga, CA (US); Hideyuki Mizusawa, Palo Alto, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 226 days.

(21) Appl. No.: 18/455,564

(22) Filed: Aug. 24, 2023

(65) Prior Publication Data

US 2025/0065230 A1 Feb. 27, 2025

(51) Int. Cl.
*A63F 13/358* (2014.01)
*G06N 20/00* (2019.01)

(52) U.S. Cl.
CPC ........... *A63F 13/358* (2014.09); *G06N 20/00* (2019.01)

(58) Field of Classification Search
CPC ............................. A63F 13/358; G06N 20/00
USPC .......................................................... 463/42
See application file for complete search history.

(56) References Cited

U.S. PATENT DOCUMENTS

| | | | |
|---|---|---|---|
| 10,887,602 B2 * | 1/2021 | Li ......................... H04N 19/154 |
| 11,582,442 B1 | 2/2023 | Fehervari et al. |
| 2019/0339688 A1 * | 11/2019 | Cella ......................... H04L 1/18 |
| 2020/0021815 A1 * | 1/2020 | Topiwala ............. H04N 19/124 |
| 2021/0168397 A1 | 6/2021 | Otto et al. |
| 2021/0211741 A1 | 7/2021 | Andreopoulos et al. |
| 2022/0051382 A1 * | 2/2022 | Chen .................. H04N 21/4662 |
| 2023/0072918 A1 * | 3/2023 | Jin ......................... G06N 20/00 |
| 2023/0099526 A1 * | 3/2023 | Chinen ................. G06T 7/0002 |
| | | | 382/254 |
| 2023/0267706 A1 * | 8/2023 | Djelouah ............... G06V 10/82 |
| | | | 382/190 |

FOREIGN PATENT DOCUMENTS

BR PI1012239 A2 * 9/2020 ........... H04L 65/752

OTHER PUBLICATIONS

"International Search Report and Written Opinion", dated Oct. 10, 2024, from the counterpart PCT application PCT/US24/036525.

* cited by examiner

*Primary Examiner* — Kwin Xie

(74) *Attorney, Agent, or Firm* — Kilpatrick Townsend & Stockton LLP

(57) ABSTRACT

Techniques are described for reducing latency in computer game network streaming using a machine learning (ML) model to determine an optimal bite rate/frame rate/resolution for encoding the video of the computer game to satisfy a just noticeable difference (JND) threshold while minimizing the amount of data being sent.

18 Claims, 4 Drawing Sheets

VARYING JUST NOTICEABLE DIFFERENCE (JND) THRESHOLD OR BIT RATES FOR GAME VIDEO ENCODING BASED ON POWER SAVING REQUIREMENTS

FIELD

The present application relates to technically inventive, non-routine solutions that are necessarily rooted in computer technology and that produce concrete technical improvements, and more specifically to varying just noticeable difference (JND) threshold or bit rates for game video encoding based on power saving requirements.

BACKGROUND

Video such as computer simulation video such as computer game video may be streamed to end user terminals over a network.

SUMMARY

As understood herein, network conditions and/or regulatory-imposed network regulations regarding bandwidth limitations for energy saving may limit the network channel available to send a video such as a computer game video. As further understood herein, particularly in the case of computer gamers, latency is a principal concern under such conditions, because gamers prefer near-instantaneous reaction to their inputs, for example when shooting game weapons. Video quality may thus be less of a concern than delivering video with little to no latency.

In a first aspect, an apparatus includes at least one processor assembly configured to input to at least one machine learning (ML) model at least one classification of at least one video, such as a computer game video, along with the video. The processor assembly also is configured to receive from the ML model at least one encoding parameter selected from the group that includes frame rate, bit rate, resolution, and encode the computer game video at least in part using the encoding parameter for storage and/or network transmission of the encoded video.

In some examples, the ML model can be trained on a training set of data that includes at least one subjective index representing whether human viewers can notice differences in variations of the encoding parameter. The subjective parameter may include mean opinion score (MOS).

In another aspect, an apparatus includes at least one computer medium that is not a transitory signal and that in turn includes instructions executable by at least one processor assembly to train at least one machine learning (ML) model using a data set comprising videos, respective classifications of the videos, and at least one subjective index representing whether human viewers can notice differences in variations of the encoding parameter. The instructions also are executable to encode at least a first video using output from the ML model.

In another aspect, a method includes inputting to at least one machine learning (ML) model at least one classification of at least a first video. The method also includes receiving from the ML model at least one value of at least one encoding parameter, and encoding the first video using the value.

The details of the present disclosure, both as to its structure and operation, can be best understood in reference to the accompanying drawings, in which like reference numerals refer to like parts, and in which:

DETAILED DESCRIPTION

Figure 1:
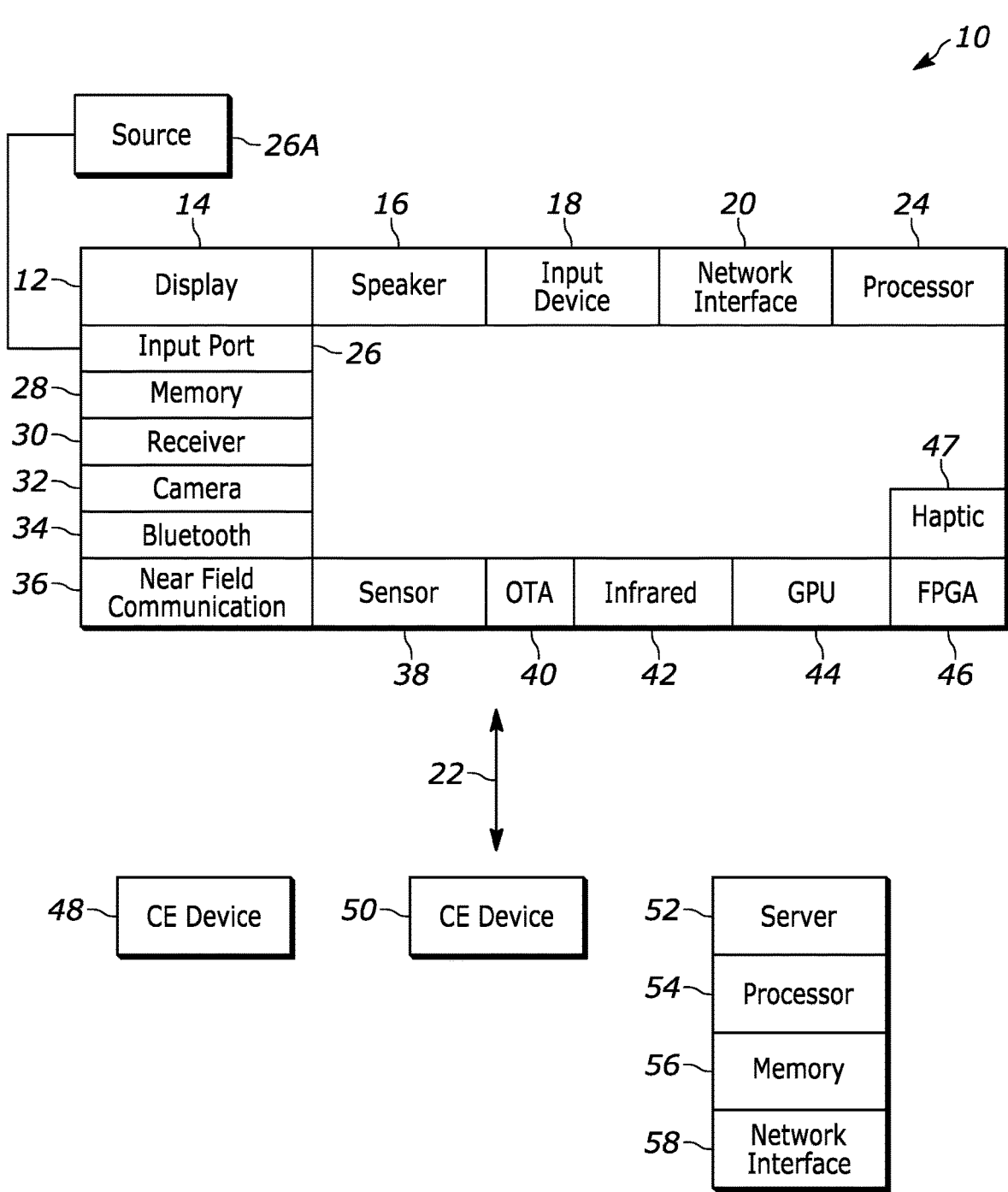
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR)

transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
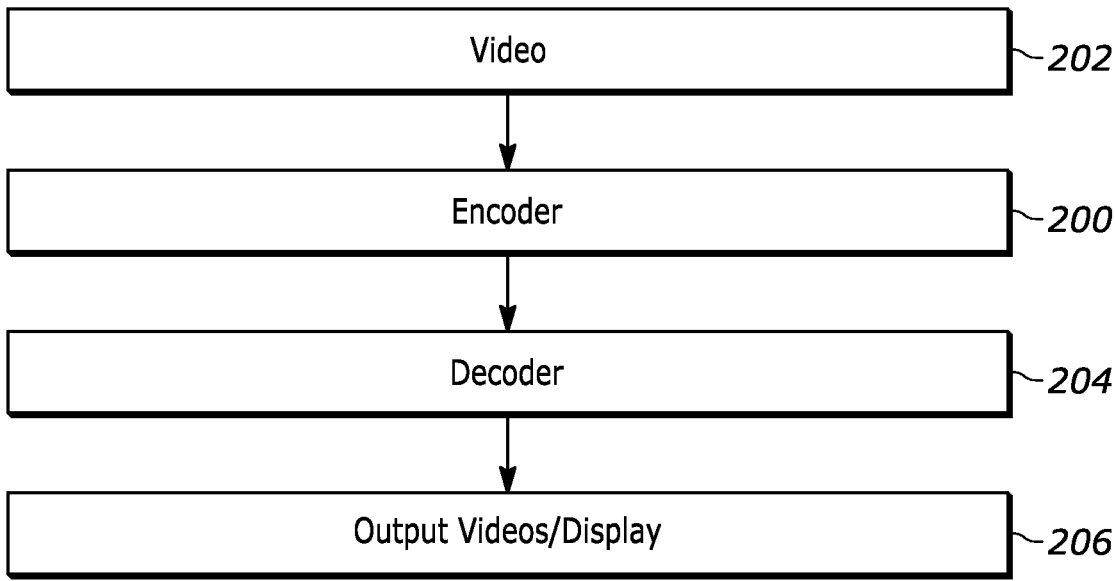
FIG. 2 illustrates an example encoder-decoder system.

FIG. 2 illustrates a system that includes a video encoder 200 for encoding/compressing videos 202. A video decoder 204 can receive the encoded videos and decode/decompress them into output videos 206.

Figure 3:
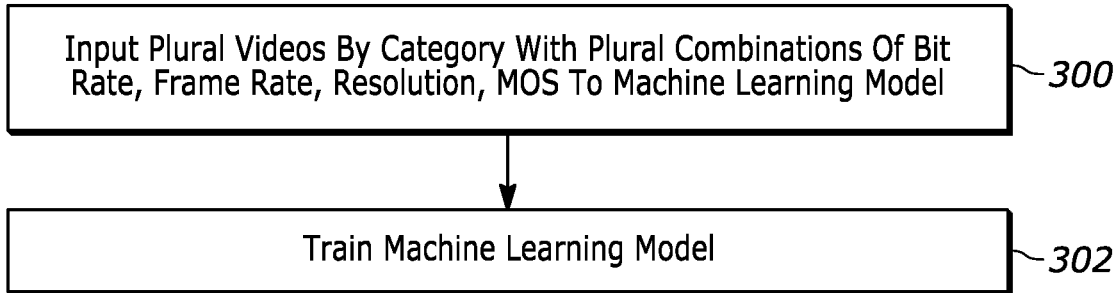
FIG. 3 illustrates example logic in example flow chart format for training a machine learning (ML) model to establish encoding parameters within just noticeable difference (JND) constraints.

FIG. 3 illustrates an example technique for training a machine learning (ML) model consistent with disclosure herein. Block 300 indicates that certain data is input to the ML model to train the ML model at block 302. The data includes plural videos such as computer game videos, each one tagged with a ground truth classification. For example, one video may be tagged as "shooting game" and another may be tagged as "driving game", while a third video may be tagged as "e-sports". The videos may be tagged by internal trait classifications such as "high motion", "low motion", "large color distribution", "small color distribution", and the like.

Moreover, accompanying the videos may be indications of encoding parameters used to encode the videos including bit rate, frame rate, and resolution.

Still further, each training video may be tagged with a subjective index representing whether human viewers on average can notice differences (or not) in variations of bit rate and/or frame rate and/or resolution for the video. One such index that may be used is a mean opinion score (MOS), which may be thought of as a subjective video quality metric.

The goal in training the ML model is to train the model to establish bit rate and/or frame rate and/or resolution at the lowest possible levels before a just noticeable difference (JND) threshold at which humans notice a degradation of quality in the video is reached. In this way, power consumption and bandwidth consumption are reduced without noticeable degradation in viewing the video.

Figure 4:
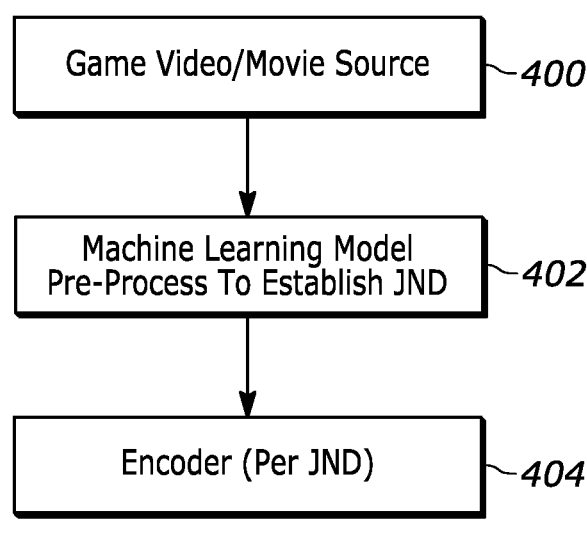
FIG. 4 illustrates a block diagram of an example encoding system.

With this in mind, turn now to FIG. 4. A video 400 such as a computer game video or a movie, along with an indication of the video classification in some implementations, is preprocessed by the ML model 402 trained according to principles herein to establish frame rate/bit rate/ resolution to achieve an encoding that is just above the JND threshold. The frame rate and/or bit rate and/or resolution necessary to achieve is output by the ML model to an encoder 404 for encoding the video. The video is then stored and/or transmitted to a display for presentation.

Figure 5:
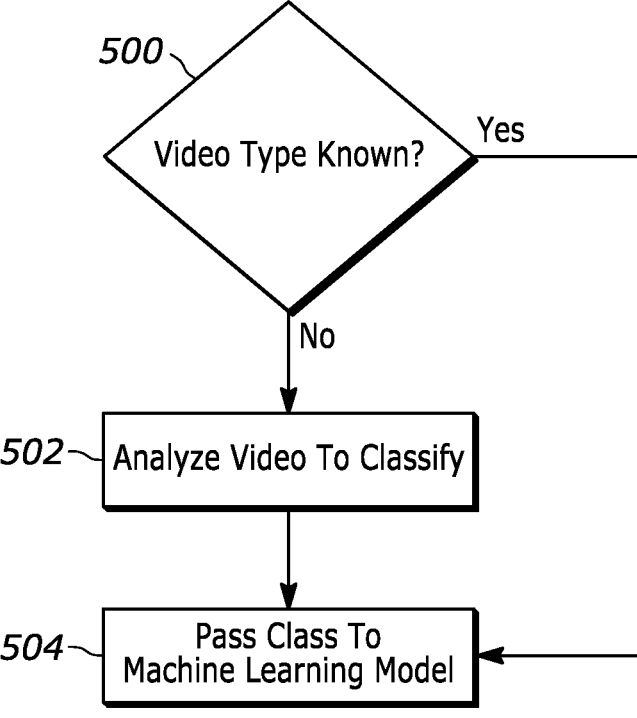
FIG. 5 illustrates example logic in example flow chart format for analyzing the classification of a game video.

FIG. 5 illustrates a technique for use in conjunction with present techniques. If the classification of the video is known at state 500, such as a game video that comes accompanied with its classification or such as a movie with a known genre, the classification is passed to the ML model at state 504 along with the video for processing as described herein. On the other hand, if the classification is not known, the logic may move to state 502 to analyze the video to classify it. This analysis may be undertaken by an ML model trained to classify videos based on the video frame sequences and audio. The detected classification is sent to the ML model 402 of FIG. 4 for processing the video.

Figure 6:
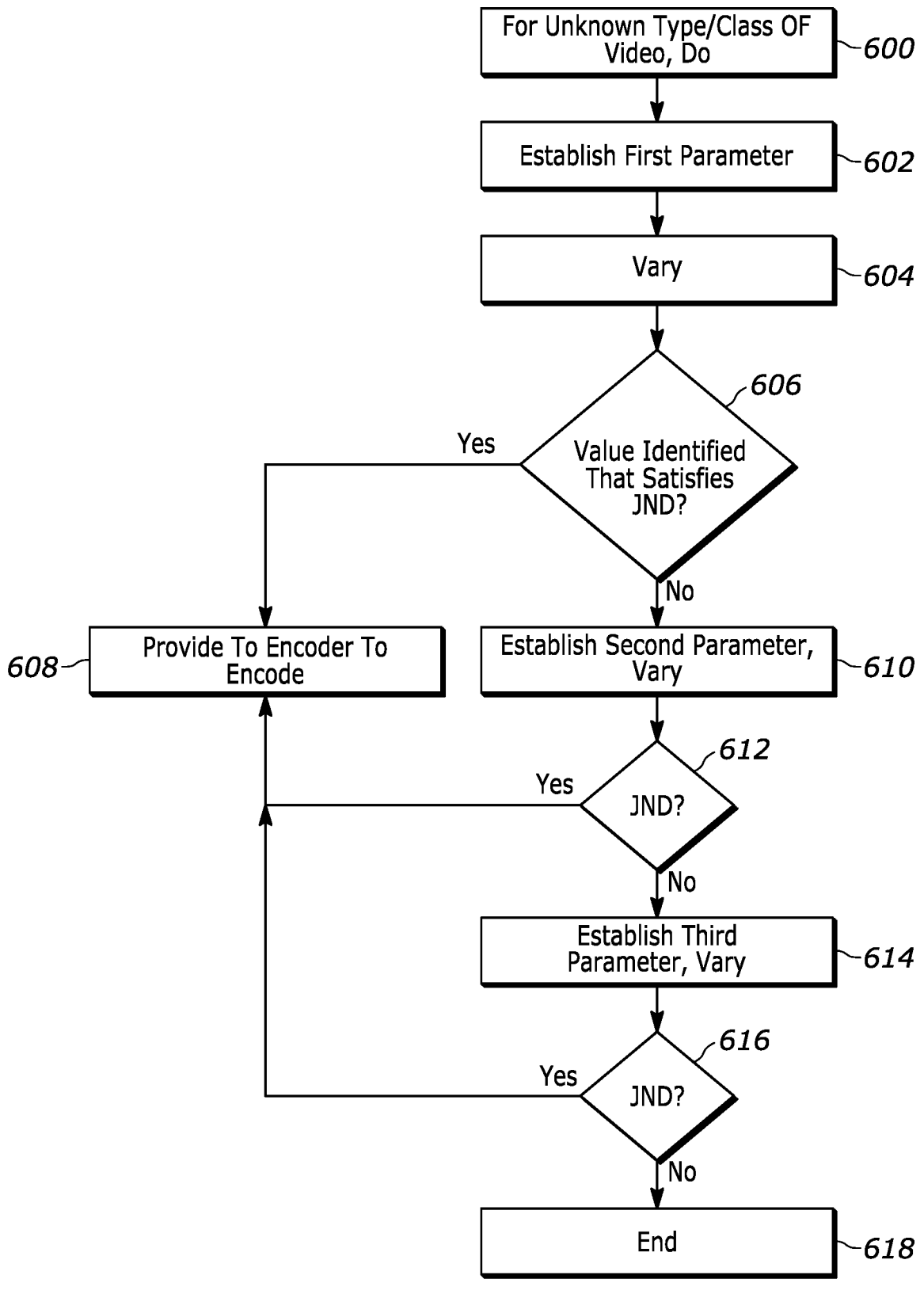
FIG. 6 illustrates alternate example logic in example flow chart format for establishing encoding parameters.

FIG. 6 illustrates yet further logic that may be implemented. Assuming that the classification of a video to be preprocessed to establish JND parameters such as those noted above is unknown at state 600, the logic moves to state 602 to establish the value of a first parameter, initially a default or standard value. The first parameter may be any one of bit rate, frame rate, and resolution. The first parameter is varied at state 604 an the ML model 402 of FIG. 4 is used to determine at state 606 when the value of the first parameter achieves an MOS score that is just above the JND threshold. If this can achieved using the first parameter value under test, the value of the first parameter is output to the encoder at state 608 to encode the video.

On the other hand, if a value of the first parameter cannot be found that achieves an MOS score that is just above the JND threshold, the logic moves to state 610 to vary a second encoding parameter until a value can be determined at state 612 that achieves an MOS score that is just above the JND threshold. The second parameter is different from the first parameter and may be any one of bit rate, frame rate, and resolution.

If a value of the second parameter can be found that achieves an MOS score that is just above the JND threshold, this value of the second parameter is output to the encoder at state 608 to encode the video.

On the other hand, if a value of the second parameter cannot be found that achieves an MOS score that is just above the JND threshold, the logic moves to state 614 to vary a third encoding parameter until a value can be determined at state 616 that achieves an MOS score that is just above the JND threshold. The third parameter is different from the first and second parameters and may be any one of bit rate, frame rate, and resolution.

Moreover, a combination of values for the first and second parameters may be varied and analyzed by the ML model to determine whether a combination of two values of the first and second parameters achieves an acceptable MOS score, and if so, those values are used to encode the video. Similarly, a combination of values for the first and third parameters may be varied and analyzed by the ML model to determine whether a combination of two values of the first and third parameters achieves an acceptable MOS score, and if so, those values are used to encode the video. Further, a combination of values for the second and third parameters may be varied and analyzed by the ML model to determine whether a combination of two values of the parameters achieves an acceptable MOS score, and if so, those values are used to encode the video. And, a combination of values for the first, second, and third parameters may be varied and analyzed by the ML model to determine whether a combination of three values of the respective three parameters achieves an acceptable MOS score, and if so, those values are used to encode the video. Combinations of parameters may be tested after each parameter is individually tested, or may be tested in between testing individual parameters. If no parameter values are identified to achieve an acceptable MOS score, the logic ends at state 618 to use the default parameter values.

Thus, if most viewers cannot distinguish a video scene renders at lower frame rate than higher frame rate, the JND model describes above outputs the lower frame rate to use to the encoder to encode at lower frame rate. Vice versa, if this criterial is no longer fulfilled or satisfied, the JND model reverses the process and instructs the encoder to encode at higher frame rate.

Present principles thus reduce digital/carbon footprint with reducing output generated by an encoder, and use the saved network bandwidth or memory storage for other usages (improved video quality, enlarged resolution, ROI) which were limited by fixed bandwidth.

While particular techniques are herein shown and described in detail, it is to be understood that the subject matter which is encompassed by the present application is limited only by the claims.

What is claimed is:

1. An apparatus comprising:
a processor assembly configured to:
    input, to a machine learning (ML) model, a classification of a video;
    input, to the ML model, an encoding parameter of the video, the encoding parameter comprising one of a frame rate, a bit rate, or a resolution;
    determine, utilizing the ML model, a just noticeable difference (JND) threshold based on a first mean opinion score;
    determine, utilizing the ML model, an updated encoding parameter based on the classification and set to achieve a second mean opinion score above the JND threshold; and
    encode the video using the updated encoding parameter, wherein using the updated encoding parameter causes the video to be presented differently than using the encoding parameter and reduces bandwidth or power usage while maintaining viewer-perceived quality.

2. The apparatus of claim 1, wherein the processor assembly is further configured to:
send the video after encoding to at least one receiver over a computer network.

3. The apparatus of claim 1, wherein the processor assembly is configured to:
store the video after encoding.

4. The apparatus of claim 1, wherein the video comprises a computer game video.

5. The apparatus of claim 1, wherein the updated encoding parameter comprises an updated frame rate.

6. The apparatus of claim 1, wherein the updated encoding parameter comprises an updated bit rate.

7. The apparatus of claim 1, wherein the updated encoding parameter comprises an updated resolution.

8. The apparatus of claim 1, wherein the ML model is trained on a training set of data comprising at least one subjective index representing whether human viewers can notice differences based on updating of the encoding parameter.

9. An apparatus comprising:
one or more processors; and
computer memory having stored thereon instructions that, when executed with the one or more processors, causes the apparatus to;

train a machine learning (ML) model using a data set comprising videos, respective classifications of the videos, and at least one subjective index representing whether human viewers can notice differences in updates of an encoding parameter, the at least one subject index comprising a just noticeable difference (JND) threshold based on a first mean opinion score;

train the ML model to receive the encoding parameter of the video, the encoding parameter comprising one of a frame rate, a bit rate, or a resolution;

train the ML model to determine an updated encoding parameter set to achieve a second mean opinion score above the JND threshold; and encode at least a video using output from the ML model based on the updated encoding parameter such that bandwidth or power usage is reduced while maintaining viewer-perceived quality.

10. The apparatus of claim 9, wherein the instructions are executable to send the video after encoding to at least one receiver over a computer network.

11. The apparatus of claim 9, wherein the instructions are executable to:

store the video after encoding.

12. The apparatus of claim 9, wherein the video comprises a computer game video.

13. The apparatus of claim 9, wherein the output comprises an updated frame rate.

14. The apparatus of claim 9, wherein the output comprises an updated bit rate.

15. The apparatus of claim 9, wherein the output comprises an updated resolution.

16. A method, comprising:

inputting to a machine learning (ML) model a classification of a video;

inputting, to the ML model, an encoding parameter of the video, the encoding parameter comprising one of a frame rate, a bit rate, or a resolution;

determining, utilizing the ML model, a just noticeable difference (JND) threshold based on a first mean opinion score;

determining, utilizing the ML model, an updated encoding parameter value based on the classification and set to achieve a second mean opinion score above the JND threshold;

receiving, from the ML model, the updated encoding parameter; and encoding the video at least in part using the updated encoding parameter, wherein using the updated encoding parameter causes the video to be presented differently than using the encoding parameter and reduces bandwidth or power usage while maintaining viewer-perceived quality.

17. The method of claim 16, wherein the method further comprises:

sending the video after encoding to at least one receiver over a computer network.

18. The method of claim 16, wherein the video comprises computer game video.

* * * * *